June 5, 1945.  R. MUELLER  2,377,355
CASING FOR ELECTRICAL DEVICES
Filed Dec. 30, 1942

INVENTOR
R. MUELLER
BY
B. M. Jackson
ATTORNEY

Patented June 5, 1945

2,377,355

UNITED STATES PATENT OFFICE 2,377,355

CASING FOR ELECTRICAL DEVICES

Robert Mueller, Westwood, N. J., assignor to Bell Telephone Laboratories, Incorporated, New York, N. Y., a corporation of New York Application December 30, 1942, Serial No. 470,656

1 Claim. (Cl. 174—12)

This invention relates to inductive devices and more particularly to the enclosing casings for such devices.

Under certain conditions it is desirable that inductive devices be immersed in oil both for insulating and for the transfer of heat from the devices. Heretofore various arrangements have been suggested to allow for the expansion of the oil with an increase in temperature without causing damage to the enclosing casing. Most of these arrangements comprise an air space in which the expanding oil compresses the air thereby protecting the casing from damage. Such air cushions are undesirable for a number of reasons among which are the tendency of the oil to oxidize thereby reducing its insulating value and the likelihood of the absorption of air by the oil which also detracts from the value of oil as an insulator.

For inductive devices which remain fixed in position when in service the disadvantages noted may be overcome by frequent inspections and replacement of the oil. For inductive devices which are used in airplanes or other vehicles which may assume positions far from normal, the device itself may not at all times be completely covered with oil. Under the latter conditions the device may be permanently damaged.

It is an object of this invention to provide an oil filled casing for inductive or other electrical devices in which the devices are always completely covered with oil.

It is another object of the invention to provide an oil filled casing for electrical devices in which, after installation, the enclosed oil is not subject to the deteriorating effects of contact with air.

It is a further object of the invention to provide a casing for electrical devices which is completely filled with oil but which is not damaged by the change in volume of the oil due to temperature changes.

The objects noted above together with others which will appear hereinafter are accomplished in one form of the invention by making the enclosing casing in the form of a bellows. One end of the bellows is hermetically sealed to a cover plate which also serves as a mounting and terminal plate. The electrical device enclosed in the casing is also supported by the cover plate and is fixed relatively thereto. The bellows not only allows for the expansion and contraction of the oil with temperature changes, but because of its corrugated form exposes a large surface to the surrounding atmosphere which aids in cooling.

The invention will be better understood from the following description and attached drawing forming a part thereof in which.

Figure 1:
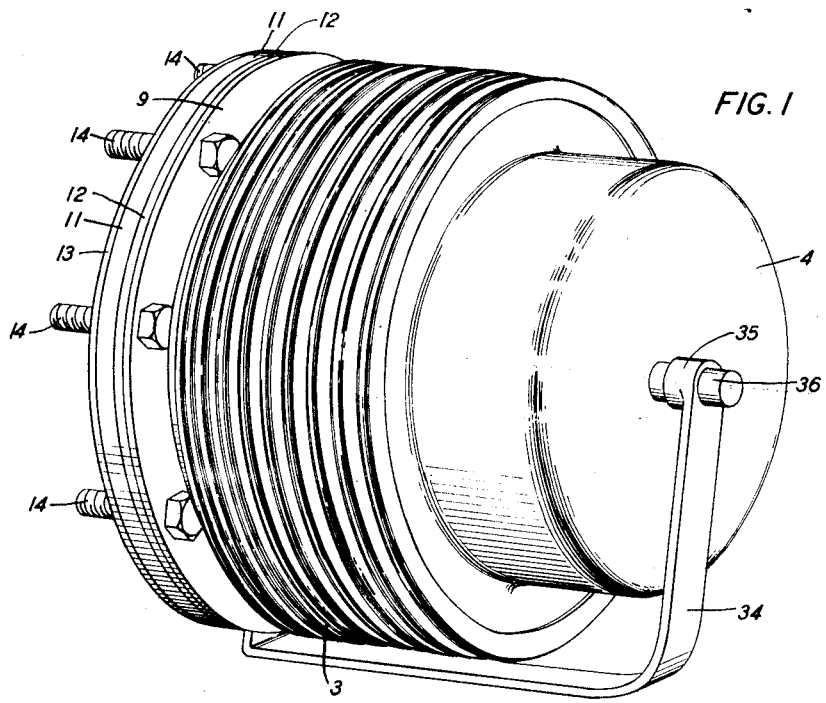
Fig. 1 is a perspective view of one form of the casing.

In the embodiment of the invention chosen for description, the casing 3 comprises a cup-shaped end piece 4 having a flared open end which terminates in a flange 5. The flange 5 is hermetically sealed to a bellows portion 6 which is of generally cylindrical form. The bellows portion 6 is so constructed that it is adapted to change form under applied force substantially only in the direction of its longitudinal axis.

To the end of bellows portion 6, opposite that to which end piece 4 is attached, there is hermetically sealed a smooth cylindrical portion 7 having flanges 8 and 9. Flange 8 is attached to the bellows portion 6 and flange 9 is adapted to be hermetically sealed to a cover 10 which also serves as a mounting and terminal plate.

Cover 10 comprises a circular disc 11 of insulating material and two annular rings 12 and 13 of metal, one on each side of disc 11 at its outer edge. The hermetic seal between flange 9 of cylindrical portion 7 and the cover 10 is made specifically between flange 9 and annular ring 12 forming part of the cover by means of bolts 14 and nuts 15. The clamping action of bolts 14 and nuts 15 forms the seal. In one embodiment, eight bolts 14 and eight nuts 15 were used to firmly and hermetically attach casing 3 to cover 10. The number of bolts used in this one embodiment should not be considered in any way a limitation, as the object may be attained with more or less bolts and nuts depending on the size of the casing, etc. Bolts 14 are made long so to act as studs for attaching the device to a mounting panel.

Figure 2:
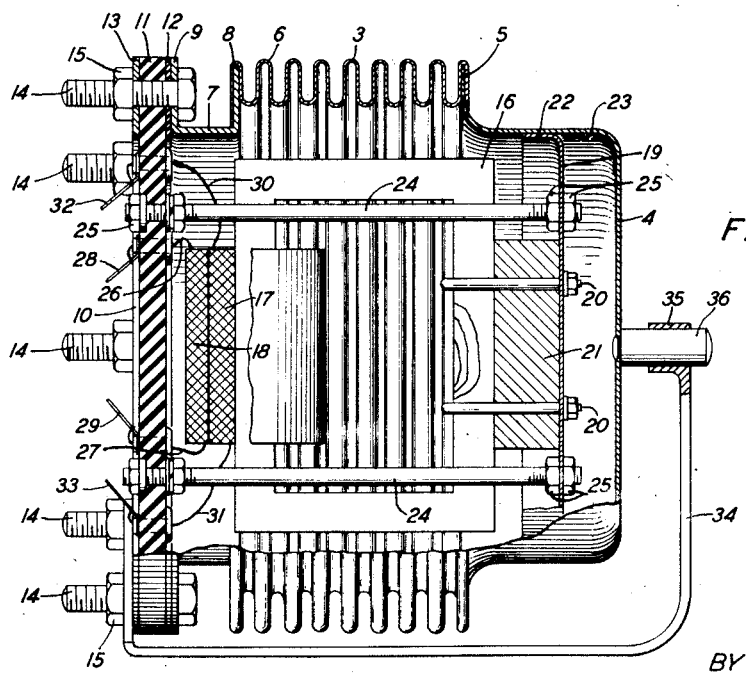
Fig. 2 is a side elevation, partially in section, of a casing adapted to enclose a transformer.

As stated previously, the electrical device adapted to be enclosed by the casing of the invention may be a transformer such as that shown in Fig. 2. Such a transformer comprises a core 16 which may be made of rectangular laminations of magnetic material. In order to simplify the drawing, the windings 17 and 18 of the transformer are shown as mounted on one leg only of the core 16.

The transformer is fixedly attached to a cup-shaped member 19 by means of U-bolts 20 and cooperating nuts in an obvious manner. A spacing piece 21 is clamped between the transformer core and member 19 by the action of the U-bolts and nuts. The spacing member will have such dimensions as will properly fix it in position in relation to member 19. Member 19 is of such dimensions that a sliding fit is formed between the cylindrical portion 22 and the inside cylindrical surface 23 of end piece 4. The reason for this sliding fit will appear hereinafter.

To maintain the transformer fixed in relation to cover 10, threaded rods or bolts 24 are fixedly attached by means of nuts 25 to the cover at one end of the bolts and at the other end by nuts 25 to member 19.

Leads 26 and 27 from winding 18 are connected to terminals 28 and 29 and leads 30 and 31 from winding 17 are connected to terminals 32 and 33. Terminals 28, 29, 32 and 33 may be of any desired type adapted for connection to an external circuit.

To prevent sagging of the free end of the casing when mounted in a horizontal position, such as that shown in Fig. 2, a bracket 34 may be provided. This bracket may be attached to cover 10 by means of certain of the bolts 14 and nuts 15. A collar 35 is provided on the end of the bracket and this collar is adapted to receive a cylindrical plug 36 which may be screwed or otherwise fixedly attached to end piece 4 of the casing.

One method of filling casing 3 with oil is to immerse it in a tank of oil with cover 10 in position but not fastened tightly to the casing. The device is allowed to remain immersed long enough to insure that the oil completely fills the casing. Nuts 15 are then screwed on to form the hermetic seal between the cover and the casing, after which the casing and enclosed transformer are removed from the tank of oil. The temperature of the oil during the filling process may be that of the room in which the filling and sealing are done. The dimensions of the casing should be such as to allow for the extreme conditions of the temperature to which the device will be exposed.

Under operating conditions with casing 3 completely filled with a liquid insulator which may be oil, it is readily seen that an increase in temperature will cause the liquid to expand. Upon expansion of the contained liquid end piece 4 will move to the right, as viewed in Fig. 2, since the bellows portion 6 tends to straighten. In moving, the inner cylindrical surface 23 of end piece 4 slides over the cylindrical portion 22 of member 19. The internal pressure becomes only sufficient to expand the bellows portion and not sufficient to rupture any joints. Upon cooling below normal temperature, the bellows portion allows contraction thereby moving end portion 4 to the left, as viewed in Fig. 2. The difference in pressure between the outside and the inside of the casing is thus kept below the rupture point. With either an increase or a decrease of temperature, the expansion of the casing occurs substantially only in a longitudinal axial direction.

It is to be understood that the casing of this invention is not limited to enclosing a transformer but may enclose any electrical device which it is desired to maintain completely covered with a liquid insulator such as oil.

It is also to be understood that the casing need not be made of metal since it has been found that non-metallic materials may also be used. One such non-metallic material may be polyvinylidene chloride.

The invention may be carried out in other specific ways than those herein set forth without departing from the spirit and essential characteristics of the invention, and the present embodiment is therefore to be considered in all respects as illustrative and not restrictive and all changes coming within the meaning and equivalency range of the appended claim are intended to be embraced therein.

What is claimed is:

In combination, an electrical device and a casing therefor, a liquid in said casing, one end of said casing being substantially free to move, means incorporated as a part of said casing whereby, upon change of volume of the enclosed liquid, the free end of said casing is constrained to move only in a longitudinal axial direction, supporting means for said device whereby said device is held in position in relation to a fixed end of said casing, said supporting means comprising a cup-shaped member of such dimensions that sliding contact exists between said cup-shaped member and the inner surface of the free end of said casing.

ROBERT MUELLER.